(12) United States Patent
Langlais

(10) Patent No.: US 7,686,957 B2
(45) Date of Patent: Mar. 30, 2010

(54) METHOD FOR TREATING FLUIDS BY COAGULATION ON MEMBRANES

(75) Inventor: Chrystelle Langlais, Le Pecq (FR)

(73) Assignee: Degremont, Rueil-Malmaison (FR)

( * ) Notice: Subject to any disclaimer, the term of this patent is extended or adjusted under 35 U.S.C. 154(b) by 793 days.

(21) Appl. No.: 10/579,989

(22) PCT Filed: Nov. 24, 2004

(86) PCT No.: PCT/FR2004/003012

§ 371 (c)(1), (2), (4) Date: Jul. 10, 2006

(87) PCT Pub. No.: WO2005/068376

PCT Pub. Date: Jul. 28, 2005

(65) Prior Publication Data

US 2007/0080112 A1    Apr. 12, 2007

(30) Foreign Application Priority Data

Dec. 18, 2003  (FR) .................................. 03 14917

(51) Int. Cl.
*C02F 1/44*      (2006.01)

(52) U.S. Cl. ...................... 210/639; 210/650; 210/702; 210/806

(58) Field of Classification Search ............... 210/639, 210/702

See application file for complete search history.

(56) References Cited

U.S. PATENT DOCUMENTS

| 6,547,969 | B1 | 4/2003 | Kezuka |
| 6,974,544 | B1 * | 12/2005 | Langlais ..................... 210/650 |
| 2002/0113023 | A1 * | 8/2002 | Krulik et al. ................ 210/749 |

FOREIGN PATENT DOCUMENTS

| FR | 01 41906 A | 6/2001 |
| JP | 05 068993 A | 3/1993 |
| JP | 5068993 A * | 3/1993 |
| WO | WO0141906 A1 * | 6/2001 |

* cited by examiner

*Primary Examiner*—Walter D Griffin
*Assistant Examiner*—Denise R Anderson
(74) *Attorney, Agent, or Firm*—Connolly Bove Lodge & Hutz LLP

(57) ABSTRACT

The invention relates to a method for treating fluids, in particular waste waters involving coagulation/flocculation, clarification by filtration or flotation stages and a stage of filtration through micro-, ultra-, and nanomembranes or of hyperfiltration. The inventive method consists in injecting two times several coagulating reagents in a quantity ranging from 75 to 125% of an optimal coagulation dose or a dose cancelling a Zeta potential (pz) in an area (area n° 1) situated upstream of the clarification stage (2) and from 0.1 to 25% of an optimal dose cancelling the pz in a second area (area n° 2) situated upstream of the stage of membrane filtration (4).

11 Claims, 2 Drawing Sheets

METHOD FOR TREATING FLUIDS BY COAGULATION ON MEMBRANES

Figure 1:
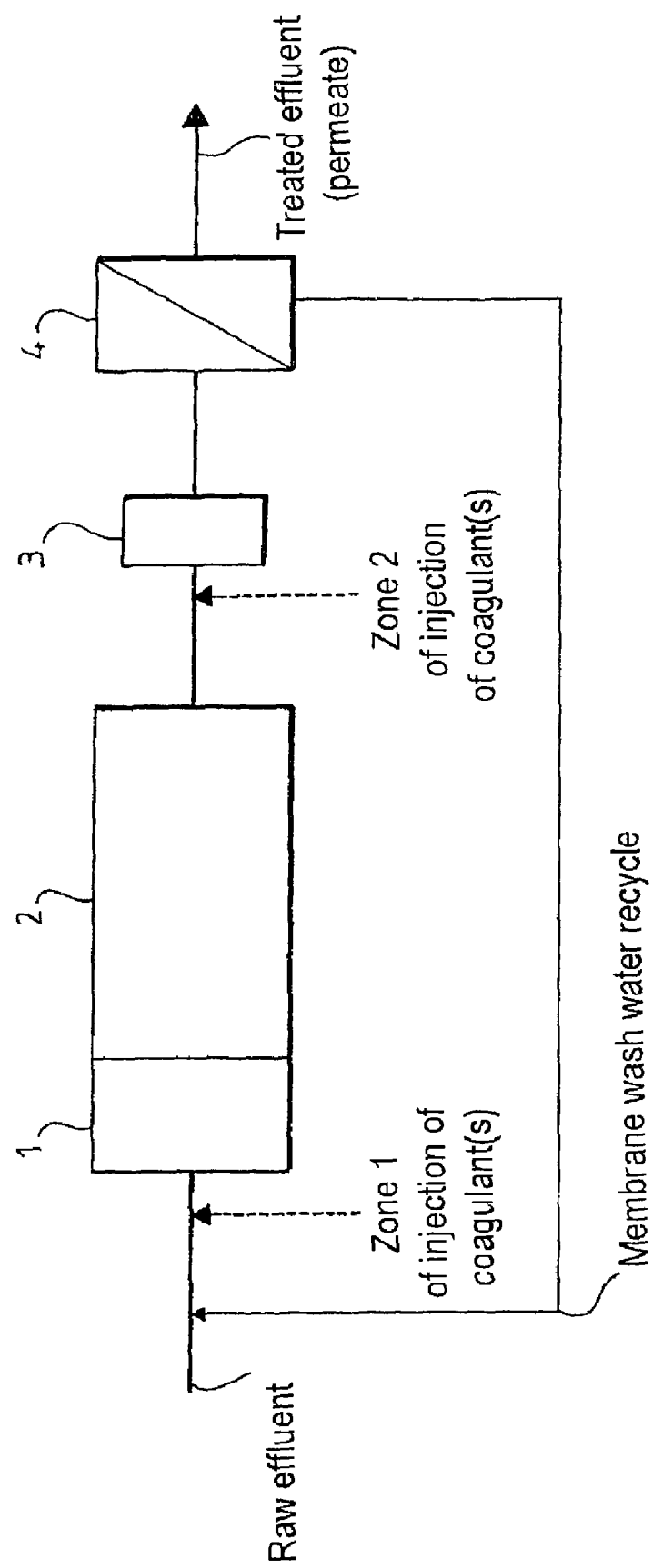

The present invention relates to a method for improving the purifying performance of the system for treating liquids, such as effluents in particular, of the coagulation-clarification-membrane filtration type, and for improving the hydraulic performance of the membrane(s) in such a treatment system (clogging control).

Micro-, ultra-, nano- and hyperfiltration membranes are vulnerable to clogging caused by the various particulate, colloidal or dissolved substances present in the effluents to be filtered, particularly water: suspended matter, organic matter, biological organisms (especially bacteria, yeast, algae) etc.

In fact, this clogging reduces the hydraulic performance of the membrane, which has a strong impact on the reliability and competitiveness of membrane technologies.

Moreover, some of these clogging substances can "cross" the membrane and reduce the quality of the filtered effluent. These dissolved substances, which cross the membrane, may be responsible for tastes and odors, and represent precursors of oxidation byproducts, the production of these oxidation byproducts possibly occurring during the subsequent disinfection of these effluents, for example by chlorination.

A person skilled in the art is therefore faced with a twofold problem:
    clogging of the membrane; and
    quality of the filtered effluent.
    Faced with this situation, two strategies are developed jointly:
    implementation of membrane washing procedures to control clogging and restore hydraulic performance. These procedures are broadly described in the literature;
    installation of one or more pretreatment steps to reduce the clogging potential of the fluids before they contact the membrane. Besides the reduced clogging of the membrane, the pretreatments generally improve the final quality of the filtered effluent.

Among these pretreatments, mention can be made in particular of coagulation, which is known to permit the removal of the organic matter and colloidal matter in suspension (see in particular Memento de l'eau, Volume 1, Chapters 3.1 & 4.1 published by Degrémont in 1989). In particular, a person skilled in the art knows that coagulation by metal salts serves to destabilize the colloids, and to remove some forms of dissolved organic matter after adsorption on the flocs formed. A person skilled in the art also knows about the use of organic coagulants (low molecular weight cationic polymer) alone or in synergy with a metal salt to carry out this coagulation step.

Several approaches are available for characterizing this treatment step:
    by "jar tests" in the laboratory (simulation of a clarification by settling) or a "flotatest" (simulation of a clarification by flotation); and
    by measuring the zeta potential (pZ) (also qualified as measuring the electrophoretic mobility) and, above all, the change in said pZ as a function of the doses of coagulant, up to determining the dose that cancels the pZ and that therefore corresponds to the treatment rate required to obtain optimal coagulation.

These two approaches lead to the definition of a coagulant dose, called the "optimal coagulation dose" which, according to the experience gained by a person skilled in the art, is the dose that permits optimized clarification, good clarified water quality, and which, in consequence, ensures the best operating conditions for the membrane (that is the least fouling or clogging conditions for the membrane).

This dose called the "optimal dose" is expressed as a concentration of "active matter". A person skilled in the art accordingly knows:
    the mass or molar metal concentration for the inorganic coagulant(s) such as, for example, iron or aluminum salts;
    the mass or volume concentration of commercial product or active product, according to the supplier's indications, in the case of organic coagulants.

Finally, a person skilled in the art characterizes the synergistic use of inorganic and organic coagulant(s) by two respective active matter concentrations as defined above. These two concentrations are generally associated with a total equivalent metal concentration.

In the case of membrane technologies, which are unaffected by the suspended matter content of the fluid to be filtered, clarification is carried out directly on the membrane, eliminating the intermediate settling or flotation step. Thus in the literature, many publications mention the use or the injection of metal salt(s) upstream of the membrane treatments. It should be observed that these publications mention doses close to the dose cancelling the pZ or, at least, high doses, approaching 30% or more of the dose called the optimal dose for cancelling the pZ.

For highly polluted fluids and/or membrane technologies sensitive to the suspended matter content of the fluid to be filtered, it is customary to employ a clarification step (settling or flotation) upstream of the membrane. In this arrangement, the quality of the filtered effluent is especially high and the clogging of the membrane especially low if the preliminary coagulation-clarification steps are optimized, particularly by the use of the optimal dose of coagulant upstream of the settler or flotation unit. In fact, the clogging of the membrane is then even lower because coagulation produces particles with a pZ close to zero (V. Lahoussine-Turcaud, M. R. Weisner, J. Y. Bottero and J. Mallevialle, 1990, Coagulation pretreatment for ultrafiltration of a surface water, J. Am. Water Work Assoc., 81, 76-81) and the fluid to be filtered on the membrane is floc free (Y. Soffer and R. Ben Aim, Adin 1. (2000) Membrane for water reuse: effect of precoagulation on fouling and selectivity, *Water science and technology*, 42 (1-2), 367-372).

The present invention has the following objectives in particular:
    to improve the quality of the fluid treated by a system of the coagulation-clarification-membrane filtration type; and
    to reduce the clogging of the membrane(s) and improve their hydraulic performance, and to achieve this technical result while improving the economics of the process, that is:
    without increasing the dose of reagents and, if possible, by reducing it;
    significantly improving the production throughput ($1/h \cdot m^2$); and
    reducing the area of membrane to be installed.

The applicant has found, surprisingly for a person skilled in the art, that degraded control of the coagulation-clarification step (reagent dose lower than the optimal coagulation dose), combined with a second coagulation step upstream of the membrane filtration step, significantly improved the quality of the filtered effluent and reduced the clogging of the membranes, while preserving a total coagulant dose lower than or equal to the optimal coagulation dose. This finding is particularly surprising because it implies a degraded water quality upstream of the membrane(s) and the presence of flocs which, for a person skilled in the art, are presumed to increase the clogging power of the fluid to be filtered.

Thus, according to the present invention, a double injection of one or more coagulation reagents is carried out, respectively in a first zone located upstream of the clarification step and in a second zone upstream of the membrane filtration step. According to the invention, each coagulation zone may be supplied via two or more injection points to permit a more progressive addition of the same dose of reagents or to avoid chemical interference when the need arises to use reagents that are liable to react with each other.

For a given raw effluent, characterized by its optimal coagulation dose, the double coagulation on membranes, the subject of the present invention, is characterized by a distribution of the injection of the coagulant(s) between the clarification and the membrane filtration in the following proportions: 75.0 to 125% of the optimal coagulant dose is injected upstream of the clarification step and 0.1 to 25.0% of the optimal dose is injected, upstream of the membrane filtration step.

According to one embodiment of this method, the injection of one or more coagulation reagents is respectively 75.0 to; 99.9%, preferably 80.0 to 99.9%, upstream of the clarification step, and 0.1 to 20.0% upstream of the membrane filtration step.

According to another embodiment of the invention, the injection of one or more coagulation reagents is respectively 90.0 to 99.9% upstream of the clarification step and 0.1 to 10% upstream of the membrane filtration step.

The present invention is also characterized by the possibility of injecting reagents of different chemical types respectively upstream of the clarification step and of the membrane filtration step.

This "staged" control of the pretreatment by coagulation-clarification upstream of the membrane(s) has many advantages:

firstly, reduced clogging of the membrane is observed, which helps to improve the hydraulic performance of the membrane and to reduce the membrane area to be installed (lower installation and operating costs);

since membrane clogging is better controlled, the operation and the washing procedures are easier to implement (lower operating cost: less frequent washings, lower concentration of washing reagent (s)); and the two preceding points result in a reduction of releases (water losses) and, on the whole, more environment-friendly practice.

For a total dose of coagulation reagent that is lower than or equal to the optimal coagulation dose, the implementation of the method of the present invention also results in:

better final quality of the filtered effluent as shown by the examples described below;

the possibility of respectively using two coagulation reagents (or mixture of reagents) of different types and/or two different coagulation conditions (pH condition, for example), upstream of the clarifier and upstream of the membrane, in order to optimize maximally, in succession, the clarification by settling or flotation, and then the clarification by membrane;

a possible reduction of reagent costs (case of a reagent dose lower than the optimal coagulation dose); and in the case of recycling of the membrane wash water containing coagulation reagent upstream of the clarifier (settler or flotation unit), an improvement is also observed in the first clarification step and, in particular, a reduction of the flocculation time by the "contact mass" effect well known on mud bed or mud recirculation settlers.

Figure 2:
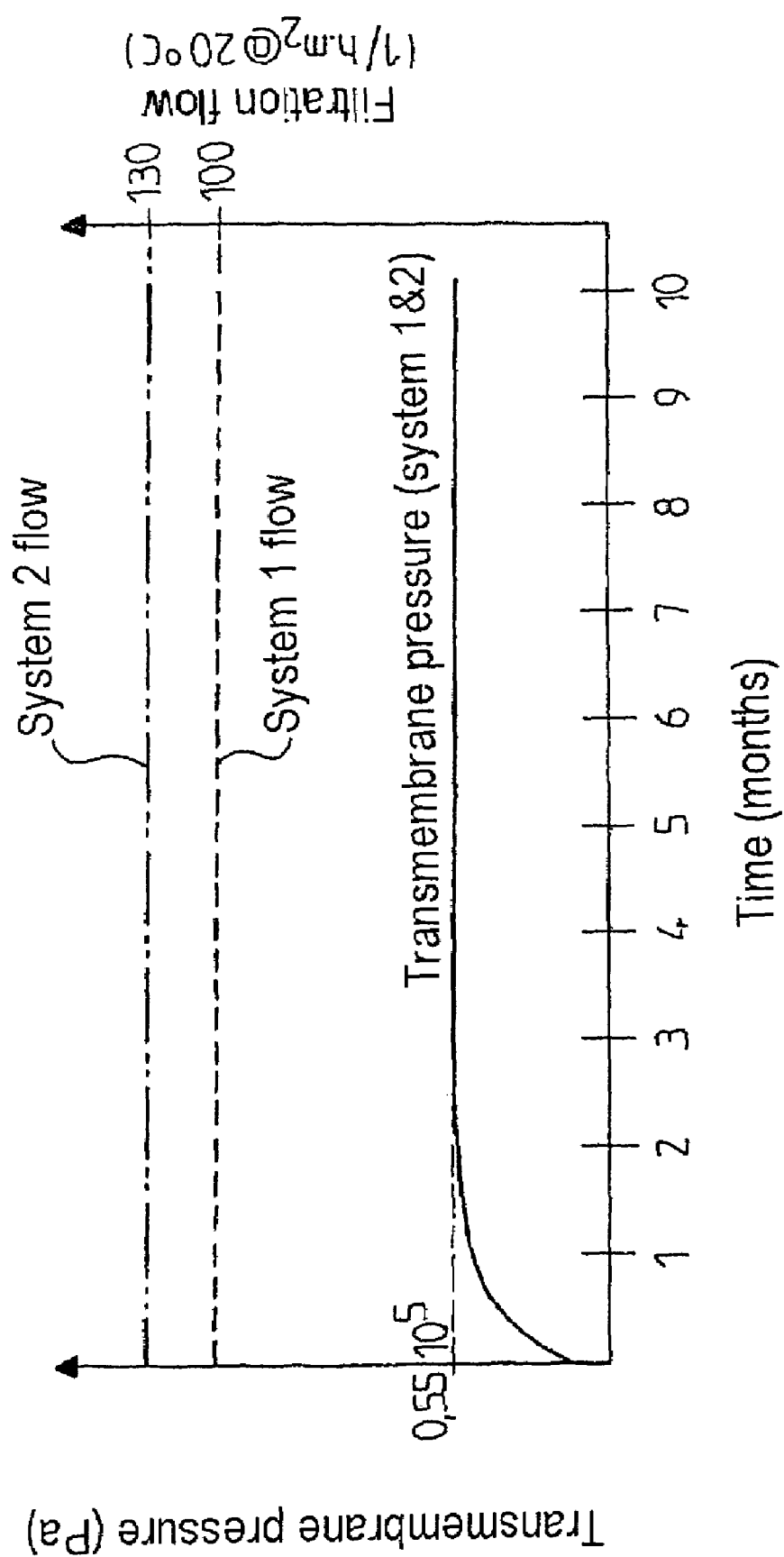

Other features and advantages of the present invention will appear from the description given below, with reference to the drawings appended hereto in which:

FIG. 1 is a schematic view showing an installation implementing the method of this invention; and FIG. 2 shows the curves illustrating the advantages and technical effects provided by the invention.

With reference to FIG. 1, it can be seen that the device for implementing the invention comprises a coagulator-flocculator 1 and a clarifier 2 (flotation unit or settler) in which the raw fluid to be treated is admitted. This device may also comprise a second coagulator-flocculator 3. After clarification, the fluid is filtered on one or more micro-, ultra-, nano- or hyperfiltration membranes. According to the invention, a double injection is carried out of one or more coagulation reagents and, for this purpose, two injection zones are provided, as shown in FIG. 1:

a zone 1 upstream of the clarification step, this injection corresponding to 75.0 to 125% of the optimal coagulation dose, that is, the dose cancelling the zeta potential (pZ), or 75.0 to 99.9% of this dose or 90.0 to 99.9% of this dose;

a zone 2 upstream of the membrane filtration step, this injection corresponding to 0.1 to 25.0% of the optimal coagulation dose, that is of the dose cancelling the zeta potential (pZ), or 0.1 to 20.0% of this dose or 0.1 to 10% of this dose.

According to one embodiment of the invention, each coagulation zone 1 and/or zone 2 can be supplied via two or more injection points as mentioned above.

According to the invention, the coagulation reagents may consist of a mixture of reagents. Furthermore, the reagents injected in zone 1 may be different to those injected in zone 2. Similarly, the coagulation conditions, particularly the pH, may be different for the two coagulation steps, these conditions possibly implying a pH correction upstream of one or of both coagulation steps.

As shown in FIG. 1, the wash waters of the membrane(s) 4 are recycled upstream of the clarification step.

In order to highlight the advantages and technical effects provided by the invention, comparative examples are described below.

EXAMPLE 1

The tests related to the treatment of a surface water (Sein) of which the properties are summarized (in column EB) in the table below.

In a laboratory test, the optimal "jar test" dose cancelling the pZ of the water to be treated was 60 mg/l of $FeCl_3$.

Two tests of the treatment of this surface water, by a system of the coagulation-flocculation-settling-filtration type followed by an ultrafiltration membrane, were carried out in parallel:

System 1 used according to the recommendations of a person skilled in the art, or an injection of 100% of the optimal jar test dose upstream of the settler (60 mg/l $FeCl_3$);

System 2 operated according to the present invention with an injection of 50 mg/l $FeCl_3$ upstream of the settler (or 83.3% of the optimal coagulation dose) and 5 mg/l of $FeCl_3$ upstream of the membrane (or 8.3% of the optimal coagulation dose). The results obtained are shown in the table and in FIG. 2.

The double coagulation described in the present invention and implemented according to the above conditions, causes a significant improvement in the quality of the treated effluent: +4 to +10% organic matter removal efficiency (oxidizability, UV, TOC, UV absorbance) for the treatment system 2.

Furthermore, despite a deterioration of the quality of the settled water and the presence of floc in the effluent in contact with the membrane, a significant reduction of membrane clogging is observed. This reduction results in a 30% increase in the filtration flow across the membrane for the same transmembrane pressure of $0.55 \cdot 10^5$ Pa applied (FIG. 2). This reduced clogging of the membrane was significant enough to permit a lengthening of the filtration cycle time from 30 to 45 minutes.

It may be observed in particular that these improvements are obtained with a total reagent dose of only 91.6% of the optimal coagulation dose, corresponding to an approximately 10% reduction in reagent consumption.

TABLE

| | | Effluent quality | | | | | |
|---|---|---|---|---|---|---|---|
| | | System 1 | | | System 2 | | |
| | EB | ED | EUF | % | ED | EUF | % |
| SM (mg/l) | 5.0 | 2.5 | <1 | — | 4.0 | <0.1 | — |
| Turbidity NTU | 4.1 | 1 | <0.1 | — | 2.6 | <0.1 | — |
| TOC (mg C/l) | 3.0 | 2.3 | 1.9 | 36.6 | 2.6 | 1.6 | 46.6 |
| $KMNO_4$ oxidizability (mg $O_2$/l) | 3.6 | 2.5 | 1.95 | 45.8 | 2.75 | 1.65 | 54.2 |
| Real color (°H) | 6 | 4.4 | 4.4 | 26.7 | 4.5 | 4.2 | 30.0 |
| UV ($m^{-1}$) | 5.7 | 4.3 | 4.3 | 24.6 | 4.4 | 4.1 | 28.1 |

Key:
EB = raw water,
ED = settled water,
EUF = ultrafiltered water,
% = removal efficiency of the entire treatment system.

EXAMPLE 2

The test was related to the treatment of a seawater with the following properties:
turbidity: 0.42 NTU;
UV absorbance 254 nm: 0.87 $m^{-1}$;
$SDI_{15}$: 15%/min.

In a laboratory test, the optimal dose determined by "flotatest" was 10 mg/l of $FeCl_3$.

Two treatment systems of the coagulation-flotation-filtration type followed by ultrafiltration membrane(s) were operated in parallel:
System 1 operated according to a person skilled in the art with an injection of 10 mg/l $FeCl_3$ upstream of the flotation unit, or 100% of the optimal coagulation dose;
System 2 operated according to the present invention with an injection of 8 mg/l of $FeCl_3$ upstream of the flotation unit (or 80% of the optimal coagulation dose) and 2 mg/l of $FeCl_3$ upstream of the ultrafiltration membrane (or 20% of the optimal coagulation dose).

The implementation of the double coagulation according to the present invention under the conditions stated above helped to improve the quality of the permeate:
the SDI of the permeate of System 2 was 1.7 compared with 2.4 for System 1; and
the UV absorbance of System 2 was 0.230 compared with 0.296 for System 1.

In this case, for the same membrane fouling rate (constant permeability), the filtration flow was increased by 23%.

It remains clearly understood that the invention is not limited to the examples described and/or shown, but that it includes all possible variants.

The invention claimed is:

1. A method for treating fluids, particularly wastewater, combining steps of coagulation/flocculation, clarification by settling or flotation, with a step of filtration on micro-, ultra-, nano- or hyperfiltration membranes, the method comprising a double injection of one or more coagulation reagents, respectively 75.0 to 125% of the optimal coagulation dose or dose cancelling the zeta potential (pZ), in a zone located upstream of the clarification step, and 0.1 to 25.0% of the optimal dose cancelling the pZ, in a second zone located upstream of the membrane filtration step.

2. The method as claimed in claim 1, wherein each coagulation zone is supplied via one or more injection points.

3. The method as claimed in claim 1, wherein the injection of one or more coagulation reagents is respectively 75.0 to 99.9%, upstream of the clarification/flocculation step, and 0.1 to 20.0% upstream of the membrane filtration step.

4. The method as claimed in claim 1, wherein the injection of one or more coagulation reagents is respectively 90.0 to 99.9% upstream of the clarification step and 0.1 to 10% upstream of the membrane filtration step.

5. The method as claimed in claim 1, wherein the coagulation reagents consist of a mixture of coagulation reagents.

6. The method as claimed in claim 1, wherein the coagulation reagent(s) injected upstream of the clarification step are different from the coagulation reagent(s) injected upstream of the membrane filtration step.

7. The method as claimed in claim 1, wherein the coagulation conditions are different for the two coagulation steps.

8. The method as claimed in claim 7, wherein said coagulation conditions imply a pH correction upstream of one or of both coagulation steps.

9. The method as claimed in claim 1, wherein membrane wash waters are recirculated upstream of the clarification step.

10. The method set forth in claim 3 wherein the injection of one or more coagulation reagents upstream of the clarification/flocculation step is in the range of 80.0 to 99.9%.

11. The method as claimed in claim 7, wherein the coagulation conditions regarding the pH are different for the two coagulation steps.

* * * * *